United States Patent
Peterson

(10) Patent No.: US 11,842,430 B2
(45) Date of Patent: *Dec. 12, 2023

(54) METHODS AND SYSTEMS FOR GROUND SEGMENTATION USING GRAPH-CUTS

(71) Applicant: FORD GLOBAL TECHNOLOGIES, LLC, Dearborn, MI (US)

(72) Inventor: John Peterson, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,129

(22) Filed: May 12, 2022

(65) Prior Publication Data

US 2022/0270309 A1    Aug. 25, 2022

Related U.S. Application Data

(63) Continuation of application No. 17/111,899, filed on Dec. 4, 2020, now Pat. No. 11,361,484.

(51) Int. Cl.
*G06T 11/20* (2006.01)
*G06T 7/10* (2017.01)
*G06V 20/56* (2022.01)

(52) U.S. Cl.
CPC .............. *G06T 11/206* (2013.01); *G06T 7/10* (2017.01); *G06V 20/56* (2022.01); *G06T 2200/24* (2013.01); *G06T 2207/30252* (2013.01)

(58) Field of Classification Search
None
See application file for complete search history.

(56) References Cited

U.S. PATENT DOCUMENTS

| | | |
|---|---|---|
| 8,311,285 B2 | 11/2012 | Ramalingam et al. |
| 8,824,797 B2 | 9/2014 | Salamati et al. |

(Continued)

FOREIGN PATENT DOCUMENTS

CN    108427124 A    8/2018

OTHER PUBLICATIONS

Ladicky, Lubor, "Energy Minimization in Computer Vision," Computer Vision and Geometry Lab, ETH Zurich.

(Continued)

*Primary Examiner* — Kee M Tung
*Assistant Examiner* — Jed-Justin Imperial
(74) *Attorney, Agent, or Firm* — Frank A. MacKenzie; Brooks Kushman, P.C.

(57) ABSTRACT

Systems and methods for segmenting scan data are disclosed. The methods include creating a graph from scan data representing a plurality of points in an environment associated with a ground and one or more objects, where the graph includes a plurality of vertices corresponding to the plurality of points in the environment, a first terminal vertex associated with the ground label, and a second terminal vertex associated with the non-ground label. A unary potential being the cost of assigning a vertex to a ground label or a non-ground label is assigned to each vertex, and a pairwise potential is assigned to each pair of neighboring vertices in the graph as a measure of a cost of assigning different labels. The methods include using the unary the pairwise potentials to identify labels for each point and segmenting the scan data to identify points associated with the ground.

18 Claims, 7 Drawing Sheets

(56) References Cited

U.S. PATENT DOCUMENTS

| | | | |
|---|---|---|---|
| 9,129,192 | B2 | 9/2015 | Cohen et al. |
| 9,396,545 | B2 | 7/2016 | Fu et al. |
| 9,704,257 | B1 | 7/2017 | Tuzel et al. |
| 10,620,317 | B1 | 4/2020 | Chai et al. |
| 2009/0316988 | A1 | 12/2009 | Xu et al. |
| 2010/0128984 | A1 | 5/2010 | Lempitsky et al. |
| 2013/0218472 | A1 | 8/2013 | Fu et al. |
| 2015/0213644 | A1* | 7/2015 | Cha .................. G06T 17/20 345/420 |
| 2018/0190016 | A1* | 7/2018 | Yang .................. G01C 11/30 |
| 2019/0025841 | A1 | 1/2019 | Haynes et al. |
| 2019/0108639 | A1* | 4/2019 | Tchapmi .............. G06T 7/10 |
| 2020/0074185 | A1* | 3/2020 | Rhodes ............... G06F 17/18 |
| 2020/0167930 | A1* | 5/2020 | Wang ............... G06T 7/0012 |
| 2020/0219264 | A1* | 7/2020 | Brunner ............. G01S 7/4802 |

OTHER PUBLICATIONS

Boykov, Y. et al., "Fast Approximate Energy Minimization via Graph Cuts," Computer Science Department, Cornell University, IEEE, vol. 23, Issue 11, Nov. 2001.

Kolmogorov, V. et al., "What Energy Functions Can be Minimized via Graph Cuts?" IEEE Transactions on Pattern Analysis and Machine Intelligence, vol. 26, No. 2, Feb. 2004, pp. 147-159.

Sedlacek, D. et al., "Graph Cut Based Point-Cloud Segmentation for Polygonal Reconstruction," Czech Technical University in Prague, Faculty of Electrical Engineering, pp. 218-227, 2009.

Guinard, S. et al., "Weakly Supervised Segmentation-Aided Classification of Urban Scenes from 3D LiDAR Point Clouds," The International Archives of the Photogrammetry, Remote Sensing and Spatial Information Sciences, vol. XLII-1/W1, 2017, pp. 151-157.

A Point Cloud-Based Robust Road Curb Detection and Tracking Method. Digital Object Identifier 10.1109/ACCESS.2019.2898689. (Retrieved on Mar. 14, 2022) Retrieved from the Internet: < https://www.researchgate.net/profile/Wang-Guojun/ publication/ 331102582_A_Point_Cloud_Based_Robust_Road_Curb_Detection_ and_Tracking_Method/links/5c865ba9299bf1268d5021e0/A-Point-Cloud-Based-Robust-Road-Curb- Detection-and-Tracking-Method. pdf Wang, G. et all Mar. 7, 2019 (Mar. 7, 2019).

"On the segmentation of 3D LIDAR point clouds," 2011 IEEE International Conference on Robotics and Automation, 2011, pp. 2798-2805, doi: 10.1109/ICRA.2011.5979818.(Retrieved on Mar. 9, 2022). Retrieved from the Internet: <https://citeseerx.ist.psu.edu/ viewdoc/download? doi=10.1.1.998.5762&rep=rep1&type=pdf> Douillard B. et al. May 9, 2011 (May 9, 2011).

\* cited by examiner

METHODS AND SYSTEMS FOR GROUND SEGMENTATION USING GRAPH-CUTS

CROSS-REFERENCE AND CLAIM OF PRIORITY

This patent application is a continuation of and claims priority to U.S. patent application Ser. No. 17/111,899 filed Dec. 4, 2020, now U.S. Pat. No. 11,361,484 issued Jun. 14, 2023, which is incorporated herein in its entirety.

BACKGROUND

Understanding environments is one of the fundamental problems for intelligent robots such as autonomous vehicles to perform dependable tasks. To model an environment, three-dimensional (3D) sensors (e.g., laser scanners such as light detection and ranging "LIDAR") are often used to obtain a set of vertices in a 3D coordinate system (referred to as a point cloud). Recent advances in 3D scanning technologies have made the fast acquisition of dense and accurate point cloud data possible with moderate costs and can facilitate vehicle perception. For example, images from sensors may be used for performing obstacle avoidance, task-specific target detection, and generation of terrain maps for navigation. When a laser scanner is used to scan a scene/urban environment, the scene often contains many objects. It is difficult to determine which points belong to which objects in the scene. For example, if a city block is laser scanned, in addition to objects such as trees, vegetation, roads, the scan may also include ground surface. For navigating an autonomous vehicle it is very important to differentiate between points belonging to the ground (ground segmentation) and points belonging to other objects in the scene such as buildings, vegetation, vehicles, etc. Specifically, ground segmentation is an important pre-processing step that removes a large number of points from the point cloud reducing the burden on downstream processing tasks (such as during perception and forecasting for autonomous vehicles). However, since ground segmentation is performed as a pre-processing step, it is necessary to achieve high accuracy to avoid downstream errors.

Ground segmentation tends to be critical for improving autonomous vehicle perception. In various environments in which autonomous vehicles typically operate, no a priori information about the ground surface is usually available. Furthermore, ground structure and appearance may significantly change during the operation of the vehicle. Thus, ground detection algorithms based on specific cues tend to not be appropriate without human supervision.

This document describes methods and systems that are directed to addressing the problems described above, and/or other issues.

SUMMARY

In one or more scenarios, systems and methods for segmenting scan data are disclosed. The systems include a processor and non-transitory computer-readable medium including programming instructions. The processor may execute the programming instructions to perform the methods of this disclosure. The programming instructions may, optionally, be included in a computer program product.

The methods may include creating a graph from scan data representing a plurality of points in an environment associated with a ground and one or more objects. The graph can include a plurality of vertices corresponding to the plurality of points in the environment, a first terminal vertex associated with the ground label, and a second terminal vertex associated with the non-ground label. The methods may also include assigning a unary potential to a vertex corresponding the cost of assigning that vertex to a ground label or a non-ground label, and assigning a pairwise potential to each pair of neighboring vertices in the graph corresponding to the cost of assigning different labels to neighboring vertices. The unary potentials and the pairwise potentials may be used to identify labels for each of the plurality of points, and the methods may include segmenting the scan data to identify points associated with the ground based on the identified labels.

In one or more scenarios, the methods may also include identifying one or more points of the plurality of points that are not associated with the ground and using the one or more points that are not associated with the ground to identify the one or more objects. Optionally, the identifications of the one or more objects may be used for navigating an autonomous vehicle in the environment.

In various scenarios, the methods may further include identifying a subset of the plurality of points that lie within a threshold distance from a ground surface within the map as being likely to be associated with the ground, and using only the identified subset of points for creating the graph.

Optionally, the graph may be created to include a plurality of edges connecting the plurality of vertices, the first terminal vertex, and the second terminal vertex. Additionally and/or alternatively, creating the graph may include using either a K-nearest neighbor algorithm such that each of the plurality of edges has a corresponding weight and/or a grid graph builder.

In some of the above scenarios, using the unary potentials and the pairwise potentials to identify labels for each of the plurality of points may include determining a unary energy function as a sum over the unary potentials of all of the plurality of vertices, and determining a binary energy function using the plurality of pairwise potentials as a sum over all neighboring vertices of the plurality of vertices of a cost of assigning a pair of ground and non-ground labels to each pair of neighboring vertices. Optionally, the unary energy may be a function of one or more weighted features associated with each of the plurality of vertices. Examples of the features can include, without limitation, ground height, relative height, color, range, sensor pose uncertainty, ground height uncertainty, semantic labels, detection masks, intensity, localization output, grazing angle, surface normal compatibility, height above ground, occlusion checking, per point ground likelihood, and/or mesh compatibility. Additionally and/or alternatively, the binary energy may be a function of one or more weighted features associated with each pair of neighboring vertices in the graph. Examples of the features can include, without limitation, point LIDAR intensity similarity between neighboring vertices, point color similarity between neighboring vertices, surface normal similarity, distance similarity, relative angle between neighboring vertices, and/or image color continuity. Optionally, the methods may also include performing a graph-cut for optimizing an energy function as a combination of the unary energy and the binary energy.

DETAILED DESCRIPTION

Figure 1:
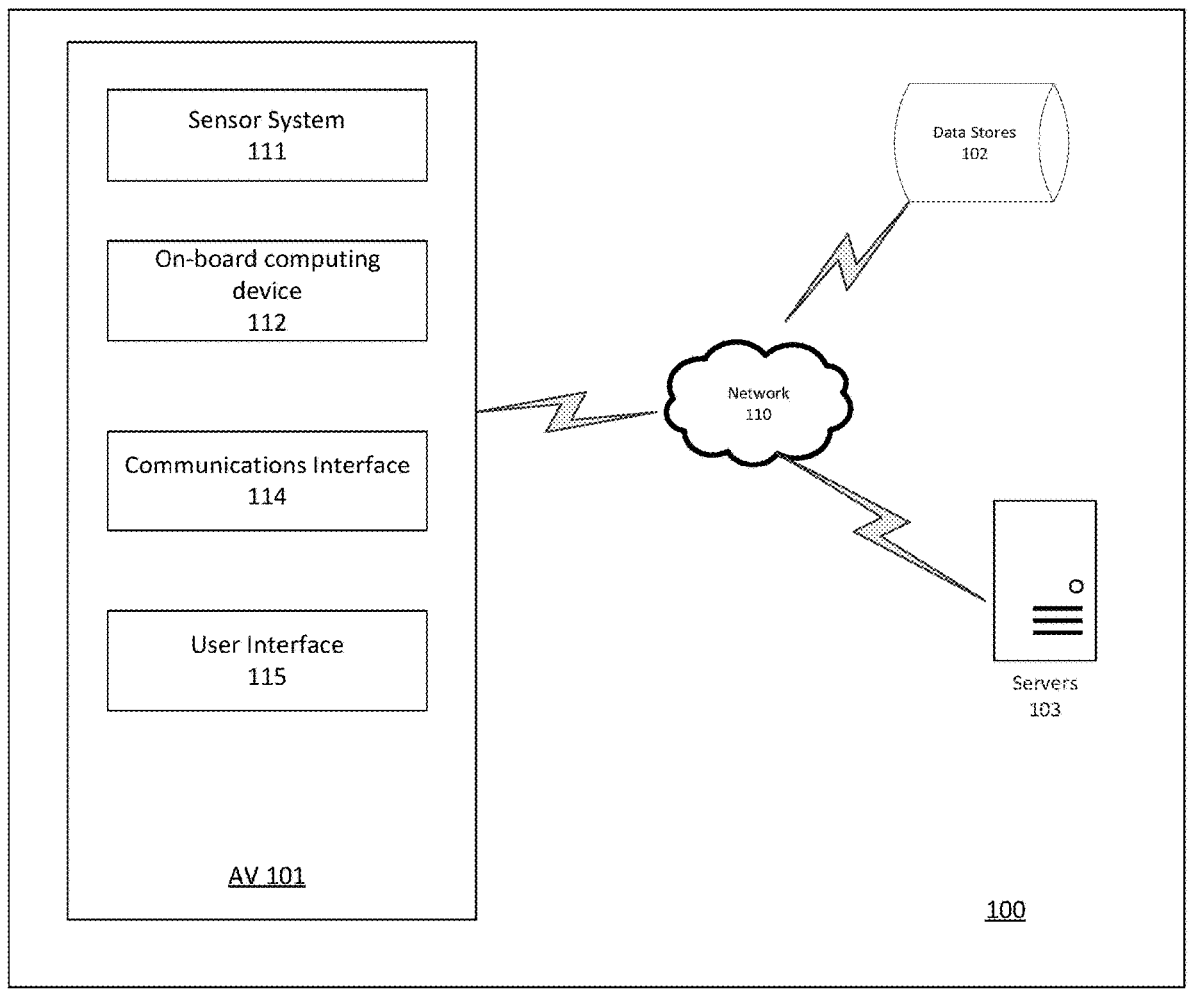
FIG. 1 is a block diagram illustrating an example autonomous vehicle system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An autonomous vehicle operating in an environment relies on detecting a ground surface and obstacles on or proximate to the ground surface for navigation. In one example, the autonomous vehicle may be configured to collect a dense three-dimensional (3D) point cloud, and segment the point cloud into obstacles and ground. The autonomous vehicle may also identify one or more features or properties of the ground surface (e.g., contours, vegetation, bumps, holes, uphill, downhill, curve, straight, curbs, road edges, etc.) for a safe control and navigation strategy. Data collected by sensors such as LIDAR sensors (referred to as point cloud data) is difficult to interpret, and segmentation is a critical pre-processing step in the interpretation of the scanned environment.

Ground segmentation is performed to separate the points that correspond to the ground surface in order to either classify ground surface and/or to distinguish points that do not correspond to the ground surface to identify points that correspond to various obstacles in the environment. In various implementations, ground segmentation combines a pre-constructed map of the environment representing the height of the ground surface with a localization system that localizes the vehicle relative to the pre-constructed map. In these approaches, if the height of a point above ground falls below a certain threshold (e.g., 0.3 m) then the point is classified as ground, otherwise as not ground. However, this hard classification is not robust to errors in the map such as, for example, an incorrect estimate of the height of the ground, and/or to long range warping of the map. Specifically, since for LIDAR points to be compared to the map, they must be transformed from the sensor frame to the map frame through the vehicle frame. This requires transformation of each individual laser frame to the sensor frame, and then from the sensor frame to the map frame through the vehicle frame. This means that point height error (in the map frame) is subject to a number of errors in each transform, including: pitch or roll error in pose, especially due to double ground (i.e., an area of the map where the points on the ground fall into 2 or more height clusters due to, for example, poor map quality), extrinsic calibration errors (e.g., incorrectly estimation of the transformation between the LIDAR sensor and the vehicle frame), intrinsic calibration errors (e.g., error in the estimate of the transform between individual lasers and the sensor body), localization errors (errors related to how the pose of the vehicle is estimated in the map frame), ground surface errors in the map, or the like. At long ranges, even a minor error in pitch of less than a degree may be enough to cause tens of centimeters of error in height. Together these may lead to inaccurate classification of points which fell on the ground as non-ground. This causes the vehicle to falsely detect presence of objects which are not present causing the vehicle to halt or juke. This may also lead to inaccurate classification of points which are associated with a non-ground object as ground potentially resulting in a collision.

The methods and systems of the present disclosure describe a ground segmentation method that uses additional factors such as the interrelation of nearby points, and utilizes graph cuts to perform binary ground segmentation. The ground segmentation can be used for, for example, maneuvering an autonomous vehicle by identifying ground surface and performing obstacle recognition.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store(s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, an on-board computing device 112, a communications interface 114, and a user interface 115. Autonomous vehicle 101 may further include certain components (as illustrated, for example, in FIG. 2) included in vehicles, such as, an engine, wheels, steering wheel, transmission, etc., which may be controlled by the on-board computing device 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a LIDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

For example, the GPS can be used to determine or estimate a geographical location of autonomous vehicle 101. To this end, the GPS may include a transceiver configured to estimate a position of the autonomous vehicle 101 with respect to the Earth, based on satellite-based positioning data. In an example, the system may be configured to use the GPS in combination with the map data to estimate a location of a lane boundary on a road on which the autonomous vehicle 101 may be travelling.

The IMU may be any combination of sensors configured to sense position and orientation changes of the autonomous vehicle 101 based on inertial acceleration. In some examples, the combination of sensors may include, for example, accelerometers and gyroscopes.

The RADAR system may be considered as an object detection system that may be configured to use radio waves to determine characteristics of the object such as range, altitude, direction, or speed of the object. The RADAR system may be configured to transmit pulses of radio waves or microwaves that may bounce off any object in a path of the waves. The object may return a part of energy of the waves to a receiver (e.g., dish or antenna), which may be part of the RADAR system as well. The RADAR system also may be configured to perform digital signal processing of received signals (bouncing off the object) and may be configured to identify the object. The received signals or RADAR-based information may be indicative, for example, of dimensional characteristics of a given surface.

The LIDAR system may include a sensor configured to sense or detect objects in an environment in which the autonomous vehicle 101 is located using light. Generally, LIDAR system is a device that incorporates optical remote sensing technology that can measure distance to, or other properties of, a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam, and scan the beam to generate two dimensional or three dimensional range matrices. In an example, the range matrices may be used to determine distance to a given vehicle or surface by measuring time delay between transmission of a pulse and detection of a respective reflected signal. In some examples, more than one LIDAR system may be coupled to the first vehicle to scan a complete 360° horizon of the first vehicle. The LIDAR system may be configured to provide to the computing device a cloud of point data representing the surface(s), which have been hit by the laser, on the road. The points may be represented by the LIDAR system in terms of azimuth and elevation angles, in addition to range, which can be converted to (X, Y, Z) point data relative to a local coordinate frame attached to the vehicle. Additionally, the LIDAR may be configured to provide intensity values of the light or laser reflected off the surfaces the road that may be indicative of a surface type. In examples, the LIDAR system may include components such as light (e.g., laser) source, scanner and optics, photo-detector and receiver electronics, and position and navigation system. In an example, The LIDAR system may be configured to use ultraviolet (UV), visible, or infrared light to image objects and can be used with a wide range of targets, including non-metallic objects. In one example, a narrow laser beam can be used to map physical features of an object with high resolution. A field of view may be illuminated with a wide diverging laser beam in a single pulse and/or point-by-point.

A camera may be any camera (e.g., a still camera, a video camera, etc.) configured to capture images of the environment in which the autonomous vehicle 101 is located. The cameras can be used to collect other details of the objects that other sensors cannot sense. In addition, a pair of cameras can be used to determine distance from the cameras to the surface over which autonomous vehicle 101 is travelling using methods such as triangulation.

It should be noted that the sensors for collecting data pertaining to the surface may be included in systems other than the autonomous vehicle 101 such as, without limitation, other vehicles (autonomous or driven), ground or aerial survey systems, satellites, aerial mounted cameras, infrared sensing devices, other robots, machines, or the like.

Figure 2:
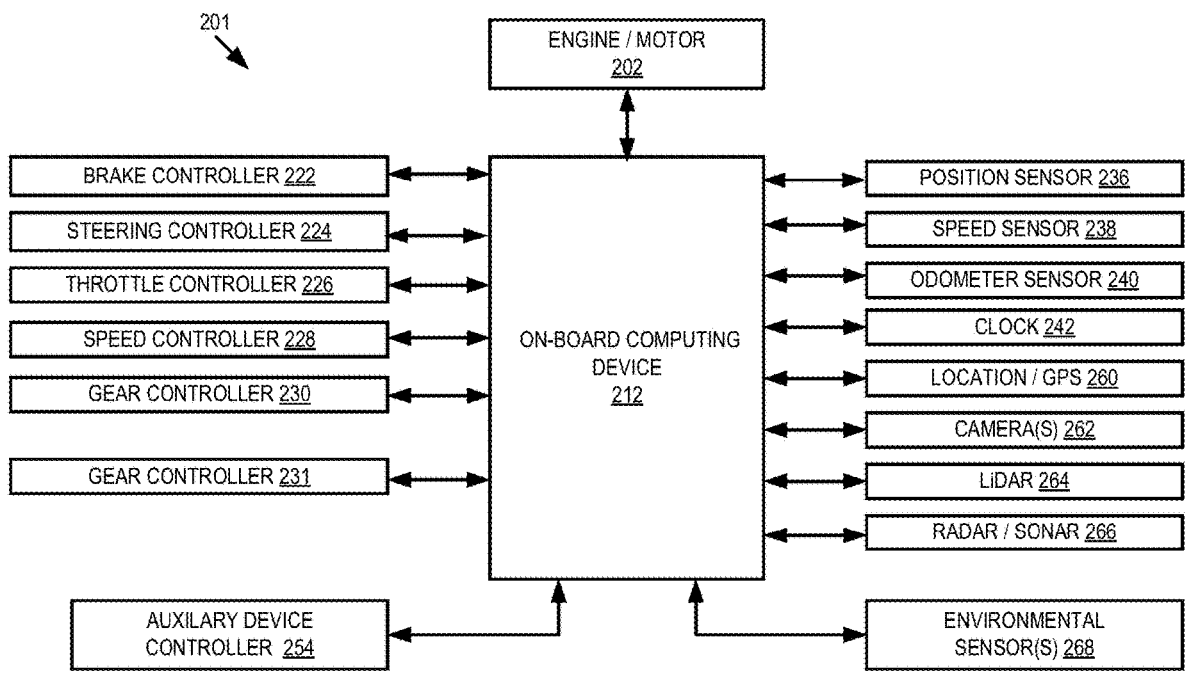
FIG. 2 illustrates an example vehicle controller system.

FIG. 2 illustrates an example system architecture for a vehicle 201, such as the autonomous vehicle 101 of FIG. 1 autonomous vehicle. The vehicle 201 may include an engine or motor 202 and various sensors for measuring various parameters of the vehicle and/or its environment. Operational parameter sensors that are common to both types of vehicles include, for example: a position sensor 236 such as an accelerometer, gyroscope and/or inertial measurement unit; a speed sensor 238; and an odometer sensor 240. The vehicle 101 also may have a clock 242 that the system architecture uses to determine vehicle time during operation. The clock 242 may be encoded into the vehicle on-board computing device 212, it may be a separate device, or multiple clocks may be available.

The vehicle 201 also may include various sensors that operate to gather information about the environment in which the vehicle is traveling. These sensors may include, for example: a location sensor 260 such as a GPS device; object detection sensors such as one or more cameras 262; a LiDAR sensor system 264; and/or a radar and or and/or a sonar system 266. The sensors also may include environmental sensors 268 such as a precipitation sensor and/or ambient temperature sensor. The object detection sensors may enable the vehicle 201 to detect objects that are within a given distance or range of the vehicle 201 in any direction, while the environmental sensors collect data about environmental conditions within the vehicle's area of travel. The system architecture will also include one or more cameras 262 for capturing images of the environment.

During operations, information is communicated from the sensors to an on-board computing device 212. The on-board computing device 212 analyzes the data captured by the sensors and optionally controls operations of the vehicle based on results of the analysis. For example, the on-board computing device 212 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers such as an auxiliary device controller 254.

Geographic location information may be communicated from the location sensor 260 to the on-board computing device 212, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors) to the on-board computing device 212. The object detection information and/or captured images may be processed by the on-board computing device 212 to detect objects in proximity to the vehicle 201. In addition or alternatively, the vehicle 201 may transmit any of the data to a remote server system 103 (FIG. 1) for processing. Any known or to be known technique for making an object detection based on sensor data and/or captured images can be used in the embodiments disclosed in this document.

The on-board computing device 212 may obtain, retrieve, and/or create map data that provides detailed information about the surrounding environment of the autonomous vehicle 201. The on-board computing device 212 may also determine the location, orientation, pose, etc. of the AV in the environment (localization) based on, for example, three dimensional position data (e.g., data from a GPS), three dimensional orientation data, predicted locations, or the like. For example, the on-board computing device 212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 212 in analyzing the surrounding environment of the autonomous vehicle 201.

The map data may also include information and/or rules for determining right of way of objects and/or vehicles in conflicted areas or spaces. A conflicted space (or conflicted area) refers to an area where more than one object and/or vehicle may be predicted to be present at the same time leading to a risk collision, unless one of the objects and/or vehicles is given precedence (i.e., right of way) to traverse the conflicted space. Examples of such conflicted spaces can include traffic lights, intersections, stop signs, roundabouts, turns, crosswalks, pedestrian crossings etc. The right of way information and/or rules for a conflicted space may be derived from traffic laws and rules associated with a geographical area (and may not be the same for all spaces). For example, for a traffic light, a vehicle that has a green light signal will have right of way over a vehicle that has a yellow or a red light signal, a vehicle going straight will have right of way over a vehicle trying to turn left or right, a pedestrian will have right of way when there is a walk sign signal, etc. Similarly, a moving vehicle will have right of way over a stopped vehicle trying to merge into traffic and/or a vehicle moving in its lane will have right of way over a vehicle merging into another lane. In another example, a pedestrian will have right of way in a pedestrian crossing. In an intersection, a vehicle going straight will have right of way over a vehicle trying to turn left or right. At a stop sign, a vehicle that arrived at the stop sign first will have right of way over a vehicle that arrived at the stop sign later.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 212 may also include and/or may receive information relating to the trip or route of a user, real-time traffic information on the route, or the like.

The on-board computing device 212 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various implementations, an on-board computing device 212 may determine perception information of the surrounding environment of the autonomous vehicle 201. Based on the sensor data provided by one or more sensors and location information that is obtained, the on-board computing device 212 may determine perception information of the surrounding environment of the autonomous vehicle 201. The perception information may represent what an ordinary driver would perceive in the surrounding environment of a vehicle. The perception data may include information relating to one or more objects in the environment of the autonomous vehicle 201. For example, the on-board computing device 212 may process sensor data (e.g., LIDAR or RADAR data, camera images, etc.) in order to identify objects and/or features in the environment of autonomous vehicle 201. The objects may include traffic signals, road way boundaries, other vehicles, pedestrians, and/or obstacles, etc. The on-board computing device 212 may use any now or hereafter known object recognition algorithms, video tracking algorithms, and computer vision algorithms (e.g., track objects frame-to-frame iteratively over a number of time periods) to determine the perception. The perception information may include objects identified by discarding ground LIDAR point, as discussed below.

In some embodiments, the on-board computing device 212 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 212 may perform one or more prediction and/or forecasting operations. For example, the on-board computing device 212 may predict future locations, trajectories, and/or actions of one or more objects. For example, the on-board computing device 212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 201, the surrounding environment, and/or their relationship(s). For example, if an object is a vehicle and the current driving environment includes an intersection, the on-board computing device 212 may predict whether the object will likely move straight forward or make a turn. If the perception data indicates that the intersection has no traffic light, the on-board computing device 212 may also predict whether the vehicle may have to fully stop prior to enter the intersection.

As discussed below in more detail, the on-board computing device 212 may also forecast a plurality of object trajectories through a conflicted space, and determine likelihoods associated with each such forecast.

In various embodiments, the on-board computing device 212 may determine a motion plan for the autonomous vehicle. For example, the on-board computing device 212 may determine a motion plan for the autonomous vehicle based on the perception data and/or the prediction data. Specifically, given predictions about the future locations of proximate objects and other perception data, the on-board computing device 212 can determine a motion plan for the autonomous vehicle 201 that best navigates the autonomous vehicle relative to the objects at their future locations.

In one or more embodiments, the on-board computing device 212 may receive predictions and make a decision regarding how to handle objects in the environment of the autonomous vehicle 201. For example, for a particular object (e.g., a vehicle with a given speed, direction, turning angle, etc.), the on-board computing device 212 decides whether to overtake, yield, stop, and/or pass based on, for example, traffic conditions, map data, state of the autonomous vehicle, etc. Furthermore, the on-board computing device 212 also plans a path for the autonomous vehicle 201 to travel on a given route, as well as driving parameters (e.g., distance, speed, and/or turning angle). That is, for a given object, the on-board computing device 212 decides what to do with the object and determines how to do it. For example, for a given object, the on-board computing device 212 may decide to pass the object and may determine whether to pass on the left side or right side of the object (including motion parameters such as speed). The on-board computing device 212 may also assess the risk of a collision between a detected object and the autonomous vehicle 201. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 212 may execute one or more control instructions to perform a cautious maneuver (e.g., mildly slow down, accelerate, change lane, or swerve). In contrast, if the collision cannot be avoided, then the on-board computing device 112 may execute one or more control instructions for execution of an emergency maneuver (e.g., brake and/or change direction of travel).

For example, if the on-board computing device 212 determines that based on the object trajectory forecasts, an object is likely to break a right of way agreement with the autonomous vehicle, the on-board computing device 212 may determine a motion plan for the autonomous vehicle that avoids collision with such an object in a conflicted space.

As discussed above, planning and control data regarding the movement of the autonomous vehicle is generated for execution. The on-board computing device 212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyboard, a touch screen display device, a microphone, and a speaker, etc.

Figure 3:
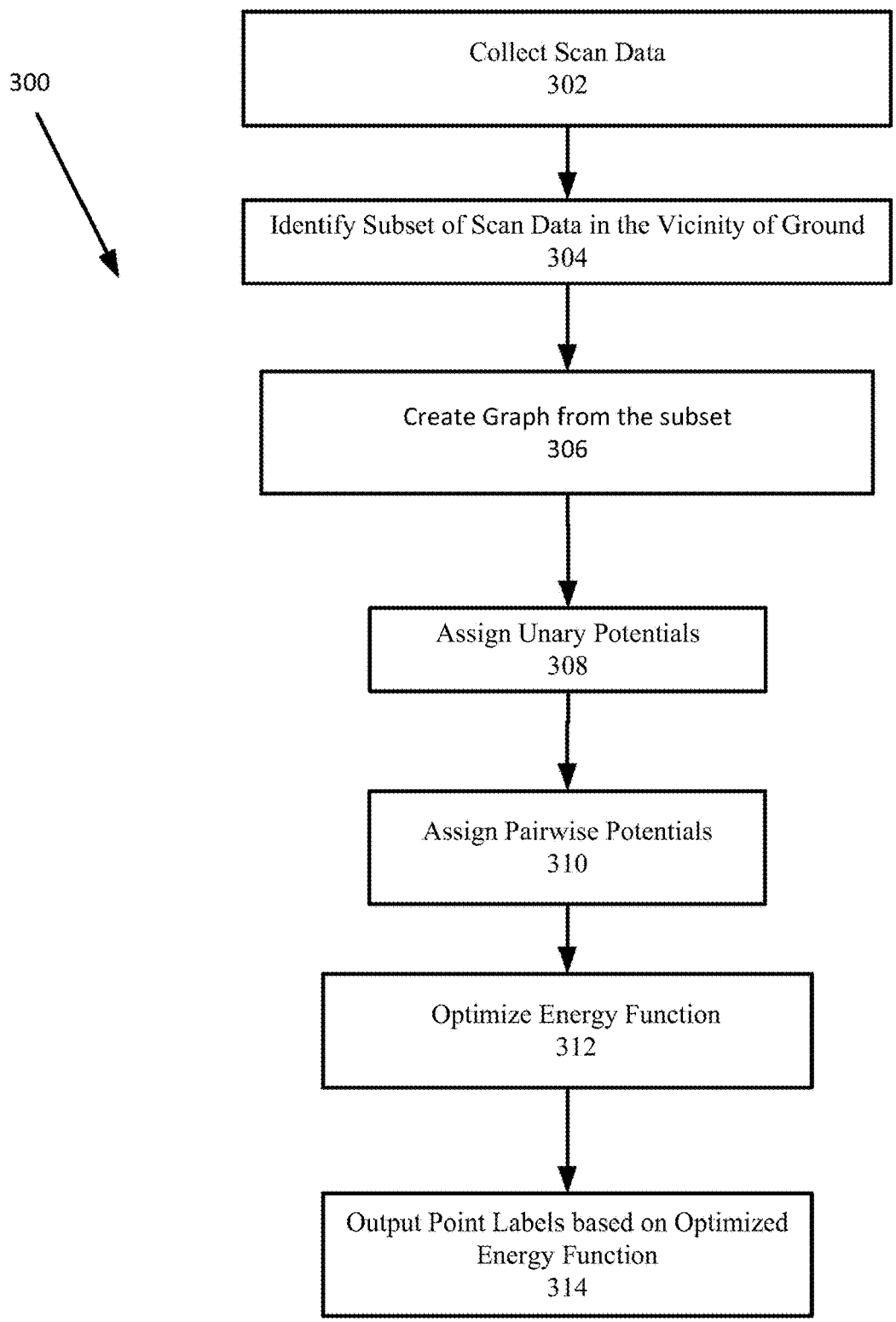
FIG. 3 illustrates a flow chart of an example process for performing ground segmentation.

FIG. 3 illustrates a flow chart of an example process 300 for performing ground surface segmentation using graph cuts according to an implementation.

As illustrated in FIG. 3, at 302, the system may collect sensor data (i.e., scan data) from an environment. The scan data may be generated by a scanning sensor such as a LIDAR. In some cases, the sensor may be attached to or part of a vehicle. The scan data may be organized into a point cloud of scan data. The point cloud data usually includes position (X, Y, Z) and intensity (i) data, and some may have color (R, G, B) data. The system may also receive pose and covariance of the sensor for collecting various scan points.

Figure 4:
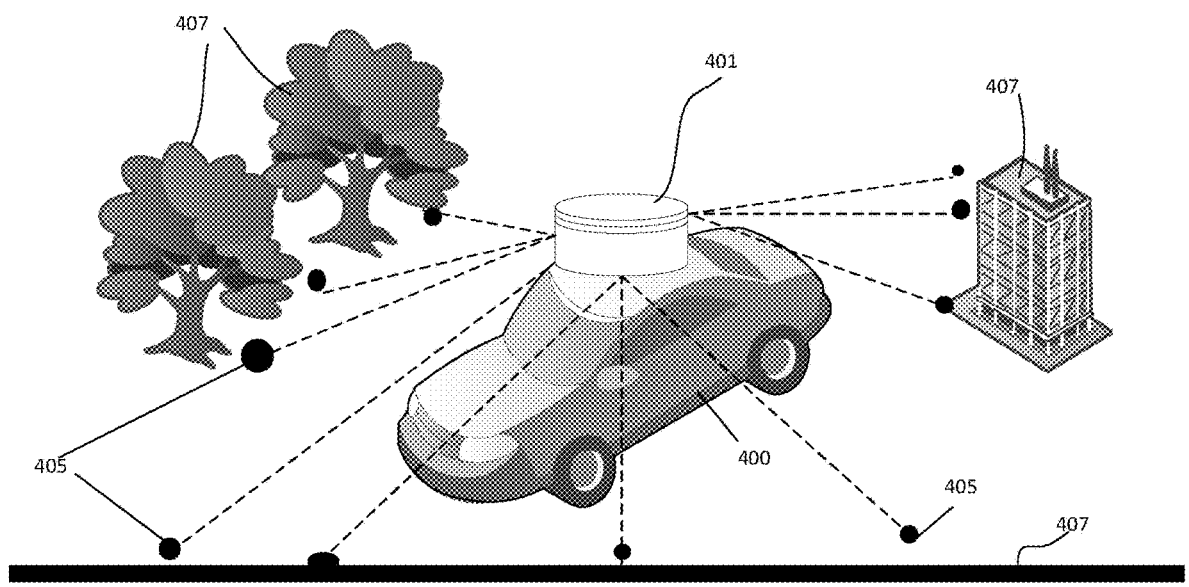
FIG. 4 illustrates a schematic system for collecting scan data.

FIG. 4 illustrates an example of a vehicle scanning system. The scanning system may include vehicle sensors 401 attached to a vehicle 400. In some cases, the vehicle sensors 401 may be the camera 262, LIDAR 264, the RADAR 266, etc. of FIG. 1. The vehicle 400 may be the vehicle 101/201 of FIGS. 1 and 2. The vehicle sensors 401 may scan an environment around the vehicle 400 and collect scan data points 405 of features 407 in the environment. For example, a LIDAR sensor may collect scan data points 405 in the environment. The scan data points 405 may be collected by the vehicle sensors 401 while the vehicle 400 is stationary or while the vehicle 400 is moving along a path. Navigation of the vehicle 400 may be controlled based on the collected and analyzed scan data points 405.

The scan data points 405 may be a measure of the distance from a feature 407 in the environment to the vehicle sensors 401 or the vehicle 400. Though a finite amount of the scan data points 405 are illustrated in FIG. 4, many scan data points 405 may be recorded for features 407 above, below, and otherwise around the vehicle 400, including the vehicle 400 itself.

Optionally, the scan data points 405 may be registered in space using a coordinate system. For example, local coordinates, geographic coordinates, geocentric coordinates, or Cartesian coordinates may be used to register the scan data points 405. Local coordinates may be a system of indices in a local coordinate space different from but associated with a broader coordinate system. Geographic coordinates may be a coordinate system that describes the location of a point relative to the earth, for example, using latitude, longitude, and elevation. Geocentric coordinates may be a coordinate system representing a point in space using x, y, and z coordinates where the origin is located at the center of mass of the earth. Cartesian coordinates may be a coordinate system that specifies the location of a point uniquely in one or more planes by a set of numerical coordinates representing the distances to the point from two or more perpendicular axes defining the planes and intersecting at an origin point. In some cases, the coordinates are registered relative to a path of the vehicle.

Referring back to FIG. 3, the system may process the received scan data (e.g., the point cloud) to identify a subset of points (304) of the scan data that are in the vicinity of ground. Optionally, the subset of points are within the vicinity of the ground and/or within a threshold range from the vehicle. Points included in the subset are further analyzed using the methods described below for classifying them as ground or non-ground.

For example, the subset of points may include points that lie within a threshold distance from the ground plane (e.g., about 0.2-about 0.8 meters, about 0.1-1 meter, about 0.3-about 0.7 meters, about 0.4-about 0.6 meters, about 0.5 meters, about 0.4 meters, about 0.6 meters, or the like). Additionally and/or alternatively, the subset may include points that lie within a maximum threshold range of the vehicle (e.g., about 45-55 meters from the vehicle in one or more directions, about 47-53 meters from the vehicle, about 40-60 meters from the vehicle, or the like). Optionally, the points in the scan data that are not included in the identified subset of points may be classified as non-ground points (i.e., the points that do not lie with the threshold distance from the ground or are outside the maximum range of the vehicle). The identified subset of points are further analyzed as described below for classification.

The threshold distance from the ground and/or the maximum threshold range from the vehicle may be determined based on, for example, the type of sensor, the orientation of the sensor, desired accuracy of ground segmentation, type of the environment, range of points within the scan data (for e.g., the threshold may be moved with range in the more conservative direction—i.e. threshold distance for excluding points from the subset increases), or the like.

For identifying the subset of points, the system may first transform the scan data from a sensor frame to a map frame (for example, to a pre-constructed map frame via a vehicle frame) to localize the sensor relative to the map. This may be used to identify, for each point, cells in a tile map the point falls into and the height above ground of the point in the map frame. The system may then use the height of each point in the map frame to identify the points that lie within a threshold distance from the ground and/or lie within a maximum range of the vehicle. The disclosure and points may also be analyzed directly in the local sensor frame. For example, the surface normal feature of a point may be compared to the surface normal to the vertical direction in the local vehicle frame, a relative angle feature may compute slopes in the local vehicle frame rather than the map frame, or the like.

Other alternative and/or additional methods for identifying the subset of points are also within the scope of this disclosure. For example, additionally and/or alternatively, a likelihood based ratio test based on a height above ground feature of the points in the scan data may be used for identifying the subset of points. The height above ground feature precomputes and considers the height above the ground of a point (optionally, in combination with a pose uncertainty of the vehicle) and the uncertainty in the ground height stored in the map to compute a likelihood that the point belongs to the ground surface or not. The system then compares the ratio of the likelihood that the point is ground to the ratio that the point is not ground to a threshold. If this ratio exceeds a threshold (e.g., about 20:1, about 19:1, about 18:1, or the like), then the point is classified as belonging to the maximum likelihood class (i.e., ground) and not included in the identified subset of points. This allows the system to analyze situations where the height above ground becomes uncertain (e.g., at a distance far from an autonomous vehicle) because the likelihood function of belonging to the ground gets broader such that the system keeps points in the selected subset to perform the segmentation at longer ranges using the methods described below.

Optionally, the system may use two separate likelihood thresholds (a primary threshold and a secondary threshold) on the likelihood ratio where the secondary threshold≥the primary threshold. In such implementations, if a point's likelihood ratio exceeds the primary threshold (e.g., 20:1), then the system may classify it as the maximum likelihood class (i.e., ground). However, if the likelihood ratio is less than the secondary threshold (e.g., 750:1), the system may still select the point for inclusion in the identified subset of points to perform segmentation as described below. Only when the points likelihood ratio exceeds the secondary threshold, the point is excluded from the identified subset of points. This allows the system to update the unary energies of adjacent unclassified points to reflect the hard classification of their neighbor (where the neighbor has a likelihood ration that is greater than a primary threshold but less than a secondary threshold). The goal is to keep points near the hard decision boundary in the identified subset so that their energies are reflected in the neighbors they would have in the full graph energy described below. For example in the full graph (described below), if an unknown point A is adjacent to a point B that is classified as not-ground using the likelihood ratio test, then the edge energy term would encourage A to also be classified as not-ground by adding a penalty to classifying A as ground when both A and B are included in the subset of points even though B is known to be a non-ground point.

In various implementations, the likelihood based ratio test may be computed by the following. Given the variance of ground height in a map frame (Var_map), the variance of the vehicle position in the z direction of the map frame (Var_vehicle_z), and the uncertainty in the roll and pitch of the vehicle (Var_vehicle_pitch), the system may compute an approximate estimate of the uncertainty in the height of the point above ground with range R as follows (using small angle approximation):

$$Var\_HAG=Var\_map+Var\_vehicle\_z+ R^2*Var\_vehicle\_pitch$$

Where,

Var_vehicle_z and Var_vehicle_pitch may be computed from an extended Kalman filter (EKF) estimating the uncertainty of the vehicle pose in the map frame;

Var_map is either a hard coded constant reflecting the overall accuracy of a map and/or a value encoded in the map itself.

The system may then compute a Gaussian probability density function and use it to estimate the likelihood of the point being ground and not ground based on its height above ground (HAG) as follows:

$$exp\_term=exp(-HAG^2/(2*Var\_HAG))$$

$$norm\_constant=1.0/sqrt(2*pi*Var\_HAG)$$

Compute the ground likelihood as:

$$P(Ground)=exp\_term/norm\_constant;$$

$$P(Not\ Ground)=(1-exp\_term)/norm\_constant$$

It should be noted that the use of normalizing constant which is related to the estimated variance lead to a decrease in the sum of the likelihoods as the variance increases. This has the effect of shifting the weight from this feature over to other features at longer range. Moreover, the ground likelihood is symmetric about a height above ground of 0. So, a point too far beneath the expected ground surface can be classified as not ground, which would allow the system to detect negative obstacles and holes in the ground surface.

The system may, optionally, account for when LIDAR beams impact an object after being reflected from the ground surface (when, for example, the road is wet). The system may account for the reflection using a rejection method where once the point is more than a threshold multiplier times (e.g., 3 or more) the number of standard deviations beneath the ground surface, then the point is assumed to be a reflection (rather than noise that is consistent with the ground surface and pose error). In this case, the above exp_term is set to 1.0 (which is equivalent to a height above ground of 0). Thus, the system favors classification of these reflection points as ground, which causes them to be not included in the identified subset of points.

The subset of identified points are points that may correspond to the ground, and are segmented as discussed below. Such processing and pre-classification of the scan data to identify the subset of points that may correspond to the ground has the advantage of conserving processing power and/or time because preforming graph cut based segmentation on the complete point cloud can be computationally expensive and/or may not satisfy the required timing constraints.

At 306, the system may create a graph using the subset of scan data which identifies pairs of neighboring points in scan data through edges of the graphical representation. The goal of this step is to turn the subset of scan data into an undirected graph G={N, E}, with the nodes N={(x, y, z)$_i$} being all the measured points in 3D (i.e., corresponding to the points in the subset of point cloud data), and the edges E={(Ni, Nj)} connecting the nodes. The graph can also include two imaginary nodes called terminals that represent assignment of points from N to two sets representing ground (S) or non-ground (T) points. Terminals corresponding to these sets are called source s and sink t. In this kind of graph, each edge is assigned with a non-negative weight or cost.

The graph may be constructed by identifying the space or coordinate frame in which the scan data points will be included as well as an algorithm for generating graph. Examples of the coordinate frame can include, for example, a 2D coordinate frame, a 3D coordinate, XYZ continuous Cartesian coordinates relative to the sensor, spherical coordinates relative to the sensor (i.e., azimuth, elevation, range), cylindrical coordinate system (i.e., azimuth, Z, distance) relative to the sensor, horizontal coordinal system relative to the sensor (2D and continuous including azimuth and elevation), range image (2D and discrete including laser ID and firing azimuth) a vehicle coordinate frame, or the like. Examples of algorithms for constructing the graphs can include, without limitation, K-nearest neighbors algorithm, variants of K-nearest neighbors algorithm (e.g., considering adjacent laser numbers), points within distance threshold algorithm, variable distance threshold algorithm, Delaunay triangulation algorithm, mesh generation algorithms (e.g., marching cubes), octree data structure based algorithms, 4/8 connected in range image algorithms, 4/8 connected in range image with additional column connections algorithm, 4/8 connected in range image with dynamic azimuth edges algorithms, and/or combinations thereof.

Figure 5:
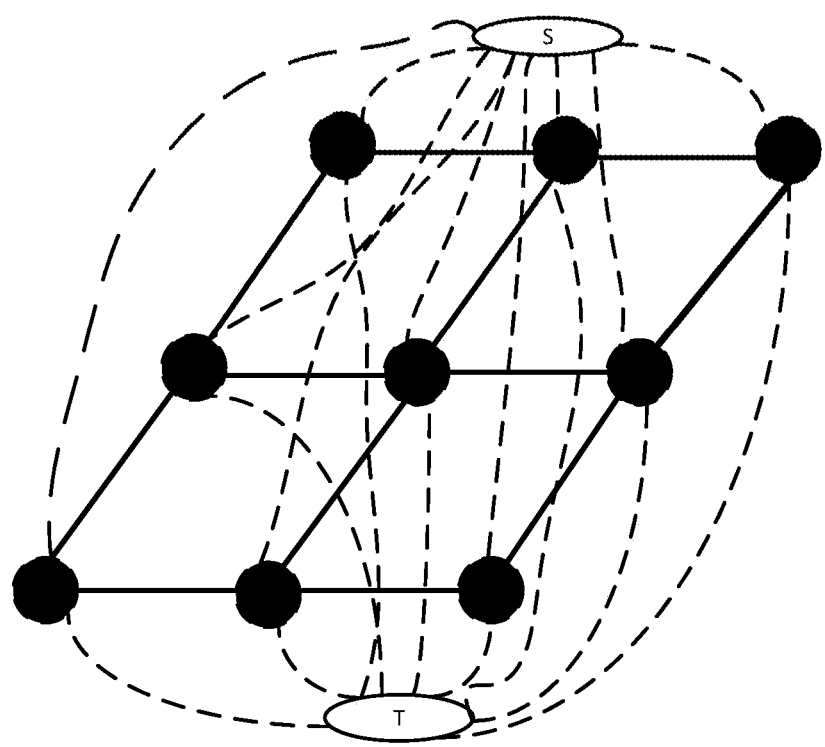
FIG. 5 illustrates an example graph constructed from a point cloud.

An example graph constructed using a grid graph builder and the XYZ continuous Cartesian coordinates relative to the sensor, where every point is connected with K=4 nearest neighbors in a grid form is shown in FIG. 5. In various embodiments, 4-connectivity or 8-connectivity may be considered, however, other connectivity are within the scope of this disclosure. Optionally, in certain scenarios a non-grid graph may be constructed using the K-nearest neighbor algorithm and the XYZ continuous Cartesian coordinates relative to the sensor (i.e., a graph similar to the graph of FIG. 5 where the nodes are randomly distributed). In a graph generated using K-nearest neighbor algorithm, closer points are more strongly connected (i.e., cost of binary energy term for a disagreement is higher). The nodes of the graph may be initially connected with K nearest neighbors where each edge E connecting two nodes may be weighted based on the distance between the end points (edge binary disagreement energy is inversely proportional), difference in color and return intensity as part of the disagreement energy, or the like. Edges among point p∈{N} and two terminals s and t may be initialized and may have a weight corresponding to the probability of assigning the point to ground or non-ground set based on, in some examples, certain a priory known information (discussed below as pairwise potentials), certain assumptions (e.g., ignore LIDAR points more than a threshold distance off the ground), or other features (e.g., comparison of the slop feature to the vertical direction in the local frame). For example, the probability may reflect how the point fits to known color model.

At 308, unary potentials may be assigned to each of the vertices in the graphical representation, for each of the possible labels (i.e., ground label and non-ground label). Specifically, the unary potential may be defined as the potential of vertex n with the label L. The overall unary energy term may be, for example, defined using the following equation:

Unary Energy=$w_1\Sigma_{n\in N}D_1n(Ln)+w_2\Sigma_{n\in N}D_2n(Ln)+ \ldots w_i\Sigma_{n\in N}D_in(Ln)$.

The unary energy term is the sum over all vertices of the cost Dn(Ln) of assigning a label Ln to a given point n. This term corresponds to the recognition part of the model. In an example objective function, in which the object is to minimize the energy, this is an energy term that the model seeks to minimize. Each Dn(Ln) can be seen as a penalty term, the cost of assigning point n to label Ln based on a given feature Di. Various methods for computing the unary potentials Dn(Ln) are described below.

This unary energy may be a function of one or more weighted features Di such as, without limitation, ground height, relative height, color features, range from sensor, sensor pose uncertainty, ground height uncertainty, semantic labels, detection masks, intensity, localization output, grazing angle, surface normal compatibility, height above ground, occlusion checking, per point ground likelihood, mesh compatibility, or the like.

The weights $w_i$ for each feature in calculating the unary energy may be manually assigned (i.e., encoded beforehand) and/or automatically learned by the system, and may be used to determine the final unary energy based on one or more of the above features. Specifically, the weights are assigned to control the relative influence of various features on the unary energy. Furthermore, many features are interdependent on each other (as described below), and the weights may vary depending upon the relationship between the features.

Range feature: For the range feature, as the angle of incidence between the sensor ray (beam) and the ground surface becomes more shallow, the sensor is less likely to get a return. The system may assume an approximately flat ground plane, so a longer return range means the angle with the ground surface should be shallower, which is not true in an environment with uneven ground surface (e.g., hills and valleys). To account for this feature, the system may, for example, use a function that increases the unary energy for labeling a point as ground at long range (i.e., as the range increases) since it is unlikely that the sensor would have gotten a return from such points unless they were perpendicular to the sensor. However, below some threshold range, the range has no effect on the unary energy to avoid biasing the classification. It should be noted that the system accounts for the range feature (as discussed above) based on an assumption that the ground surface is planar and the vehicle is level.

Relative Range feature: The system may analyze the difference in range between adjacent points to infer the presence of a foreground object. The closer point between neighboring points is likely to be a foreground object. Specifically, large range discontinuities between points measured by the same laser are indicative of the presence of a foreground object. At longer ranges, this is a less effective cue because the return range becomes more sensitive to the contour of the road as the angle between measurement and surface becomes shallower. To account for this feature, the system may, for example, use a function that increases the unary energy for labeling a point as ground upon detection of range discontinuities (since a discontinuity may indicate the presence of a non-ground object).

Pose Uncertainty may be analyzed using the height above ground feature discussed above in step 304 to compute a likelihood ratio of a point being ground. The system may then assign a high or low unary energy to the point depending on a determination of the point being non-ground or ground (respectively).

Relative Height Feature—Many objects may have nearly vertical sides. For such objects, if a point is above an adjacent measured point, then the higher point is likely not ground. This feature is particularly useful since it does not require prior knowledge of the map nor an absolute pose relative to the map and increasing its weight makes the system more robust to errors in the map. However, it may not be as effective at long range where scans become sparse enough such that people and car sized objects are typically only hit by a single laser line.

For two adjacent points (x and y), the system may compute relative height feature as the difference in z height in the local frame with respect to each other. The system may also compute the horizontal distance between the points. The system may then, for each point (considering each neighbor) determine the maximum value across the neighbors as follows:

intermediate_val=$abs$(delta_z)/max(delta_xy,minimum_xy)

The minimum_xy value is configured such that a "divide by 0" is avoided for points directly above one another. Furthermore, for each point:

Ground_Likelihood=clamp(scaling*inermediate_val, 0,1)

The ground likelihood is computed by multiplying the value by a configurable scaling factor then clamping between 0 and 1. Points that are likely to be ground are assigned a low unary energy term, and points that are unlikely to be ground are assigned a high unary energy term.

NotGround_Likelihood=1−Ground_Likelihood

In situations of beam sparsity, two points forming a vertical edge may not be a sign that the upper point is not ground at long ranges because of the angular separation between beams. Rather, the vertical edge may be a sign that the lower point is also not ground because with the sparse range rings formed by beam hitting the ground, it is unlikely that the object will be coincidentally above ground points. The system may account for such points by a first pass weighting on the delta_z value in the above calculation for range feature. Where z_a is the z height of the point in the local frame and z_b is the height of the neighboring point in the local frame. Therefore, for a range less than a minimum threshold range (R1) the system may determine:

delta_z=(z_a−z_b) for (z_a−a_b>0); and 0.0 otherwise;

For a range greater than a threshold maximum range (R2), the system may determine:

delta_z=(z_a−z_b),regardless of the sign; and

For negative values of z_a−z_b when range is between R1 and R2, the weighting of the unary energy may be ramped up from 0.0 to 1.0.

Color features: By projecting LIDAR points into camera images, the system can use additional information gathered by the cameras. Drivable road area typically consisting of asphalt and concrete are shades of grey (ignoring lane markings such as the double yellow lines). So, the presence of bright saturated colors may suggest the presence of a non-road object. And, since there is a higher probability that lower color saturation points are received from asphalt or concrete, and are more likely to have fallen on the ground surface. For example, the system may assign a function to the color features to decrease the ground label energy for points as the color saturation decreases. Optionally, a color of ground surface (e.g., brick roads are red) may be encoded in the map itself as a defined rule assigning a low energy to points that have a red color for belonging to the ground class.

Intensity features: With respect to LIDAR return intensity, low intensity may be more likely to be ground because asphalt has a low reflectivity. Specifically, the return intensity is jointly determined by the reflectivity of the material, as well as the angle between the laser and the surface normal. A higher return intensity indicates that the surface is lighter or that the angle between the surface and our beam is closer to perpendicular. Assuming that the ground surface is a constant reflectivity, the system can gain knowledge of the relative angle from the return intensity. For example, the system may assign a function to the intensity features to decrease the ground label energy for points as the intensity decreases.

Semantic labels: Semantic labels obtained from camera imagery may be used as a feature. Camera imagery can classify pixels in the imagery as road, sidewalk, terrain, vegetation, cars, pedestrians, etc. By projecting the LIDAR sweep points into camera imagery, the system may obtain a per-point class label. The points that appear to correspond to the road way, sidewalk, terrain, and other ground type classes may be assigned a low energy for belonging to the ground class while points that appear to belong to non-ground semantic classes may be given a high ground energy (and low non-ground energy).

Detection Masks: If a point projects into a camera frame inside a detection mask, then it is unlikely to be ground (except for parallax and motion effects), and the system may assign weights accordingly.

Grazing angle: The likelihood of getting a return off of a surface diminishes as the angle between the laser beam and the surface gets shallower. Specifically, assuming that a point has hit the ground surface (i.e., a return was received), the system may use a prior map and the pose of the vehicle in the map to estimate the angle of incidence of the beam. The system may then compute a probability of receiving a return from the ground surface based on the angle of incidence. At long ranges, as the angle becomes shallow, the likelihood of receiving a return reduces. However, the assumption was that a return was received, which means that the point is unlikely to be ground (and should be assigned a higher unary energy). This feature allows for the used of map information to make the determination robust to hills and valleys (hills change the angle of incidence which causes the range feature to be a false positive when looking at a hill at long range).

Surface normal compatibility: This feature is a comparison of point surface normal with what the ground surface should be at a given location. For example, this feature can be used to check if the surface normal points in the vertical direction. A surface normal pointing in the vertical direction is indicative of the surface likely being ground (or vice versa), and the corresponding unary energy term may be accordingly reduced/increased. Optionally, the surface normal feature can compare the surface normal to the expected surface normal value stored in the map (instead of an assumed vertical direction).

Occlusion checking: This feature relates to checking whether the sensor would have line of sight to a point assumed to be on the ground. This may be susceptible to curvature over long ranges, and the weight may be adjusted accordingly.

Localization output: To localize the vehicle, a localization system registers the LIDAR sweep with the localization prior (based on map information), which is a point cloud representing the stationary parts of the environment such as buildings, walls, roadways, etc. This registration step aligns the LIDAR sweep with this point cloud model representing the stationary parts of the environment. However, all points in the sweep may not match up with the map. For example, a point on a vehicle may be an outlier when the map does not contain vehicles in it, and the system may use this point as part of ground segmentation. Points that are outliers are very unlikely to be ground and may be assigned a high unary energy term (or vice versa).

Per point ground likelihood: The uncertain height above ground feature described above may not take pose errors into account completely. For example, as the pose of the vehicle changes, the cell in the map that the LIDAR point projects into may change. In such situations, rather than computing a ground likelihood based on an assumption of the cell in the map the point projects into, the system may compute the expectation over different cells the point could project into. The system may then perform the uncertain height above ground feature determination as discussed above, and adjust the unary energy term accordingly.

Mesh compatibility: This feature utilizes a mesh based map reconstruction, and then uses to the height above ground determined using mesh based map as well as the surface normal to determine the likelihood of a point being on the ground.

At 310, pairwise potentials are assigned to each of the neighboring pairs of vertices in the graphical representation, for the pair of the labels (i.e., ground and non-ground labels). The binary energy term expresses the sum over all neighbors (n, m) of the cost of assigning a pair of labels (Ln, Lm) to neighbors (n, m).

$$\text{Binary energy} = \Sigma_{n,m \in N} V_{n,m}(Ln, Lm)$$

Here, the pairwise potential $V_{n,m}$ (Ln, Lm) for two points or vertices (n, m) is the cost of assigning a pair of labels (Ln, Lm) to neighbors (n, m). This term is responsible for the regularization in the model: neighboring pixels are encouraged to share the same label (avoiding noise in labeling). Thus, for example, if the possible labels are binary (i.e., ground and non-ground), the binary energy term promotes the label pairs (ground, ground) and (non-ground, non-ground) and discourages (but does not prevent) the label pairs (ground, non-ground) and (non-ground, ground), i.e., assigns a lower cost when the labels are in agreement.

However, this term is also responsible for aligning the segmentation with the object borders, where there is desirably a distinct change from one label to another, i.e., the labels of neighboring points can disagree at the point where one region changes to another. To ensure both properties, in certain implementations, a Potts model can be employed as a pairwise function. A Potts model is a generalization of the Ising model. Not only does it penalize neighboring points which are in disagreement with respect to their labels (as in the Ising model) but the penalty terms depend on the magnitude of the difference in the observations. The greater the difference between point, the smaller the penalty. This has the effect of lowering the constraints next to image/point cloud contours. It produces a regularized segmentation, with region borders following the contours. Other similar models are within the scope of this disclosure such as, for example, point difference term that scales the binary energy by distance between the points.

The pairwise potentials are based on features such as, without limitation, point LIDAR intensity similarity between neighboring vertices, point color similarity, distance similarity, relative angle, image color continuity, or the like. For example, the Potts model may be modified to have lower energy for disagreements as the distance between points grows, as the difference in color between points increases, and/or as the difference in LIDAR intensity between the points increases. With respect to the relative angle, the closer the points are to vertical from one another (i.e., if a point is above another, that could indicate the boundary between ground and non-ground), the lesser is the cost of disagreement between point labels. Optionally, such a relative angle function may require some weighting by the absolute distance between the points so that short discontinuities (e.g., <1 cm) are still encouraged to be in the same label class. For the normal feature, the system may compute a dot product between the estimated surface normal of two points. And, the more similar the surface normal are to one another, the greater the disagreement energy for assigning them different classes. With respect to image color continuity, the system may take the color of the pixel that each LIDAR point in the edge projects into, and then compute the difference in the color value as a measure of similarity (increasing the cost of disagreement as the similarity increases). Optionally, the system may project each LIDAR point in an edge onto image coordinates, and search for a path between them such that the binary energy cost can be the sum of squared color differences between pixels in the path. This feature allows the system to take advantage of the dense data provided by cameras to determine if two LIDAR points should be grouped together, and is particularly useful at long range where the distance between points makes adjacency less useful.

Thus, for example, the pairwise function operates such that for a first pair of vertices whose labels are different, having a first difference between the observed feature values, the pairwise potential will be higher than for a second pair of vertices whose labels are different but which have a lower difference between the observed feature values.

Figure 6:
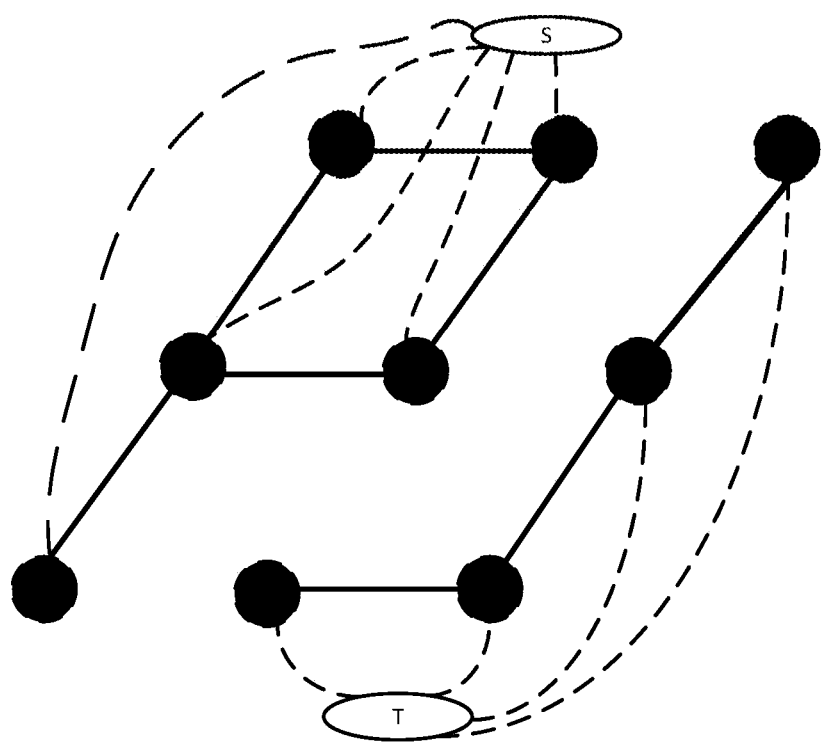
FIG. 6 illustrates the graph of FIG. 5 segmented into ground and non-ground segments.

At 312, an energy function is optimized, where the energy function aggregates the unary potentials (unary energy) and the pairwise potentials (binary energy). In particular, the energy function is an optionally weighted combination of the unary and pairwise potentials which is optimized, e.g., minimized over the set of possible labels, using, for example, graphical models (e.g., graph-cut method). In the optimization, the system may provide an exact or an approximate solution to the energy function optimization problem. Graph cut is an s-t cut (in the graph of FIG. 5) that is a subset of edges that the terminals S and T become completely separated on the induced graph. As illustrated in FIG. 6 any cut corresponds to some binary partitioning of an underlying point cloud into "ground" and "non-ground" segments. For example, as shown in FIG. 6, a potential segmentation line is drawn through the graph shown in FIG. 4 segmenting the ground and non-ground points using the energy function. The goal is to compute the best cut that would give an "optimal" segmentation.

At 314, the point labels corresponding to the optimized energy function are output. For example, the points in the point cloud labeled as ground using the energy function may be assigned a first color, and the points in the point cloud labeled as non-ground using the energy function may be assigned a second color in a visual display of the point cloud. Optionally, the regions can be labeled as ground or non-ground in a visual display. Alternatively and/or additionally, the ground segmentation may be output in a visual display as pixel colors applied to a range image.

The above described ground segmentation may be used to filter out the ground points, and the point cloud data may be segmented in an attempt to find/classify/separate the different objects in the point cloud data. The selected and classified objects may be used to control the navigation of an autonomous vehicle. For example, the autonomous vehicle may be controlled to avoid collision with one or more detected objects. Due to the large scale and density of laser scanned points from an urban environment, significant memory is consumed during the segmentation process; and ground point removal reduces required processing times, memory, and other computing resources.

Figure 7:
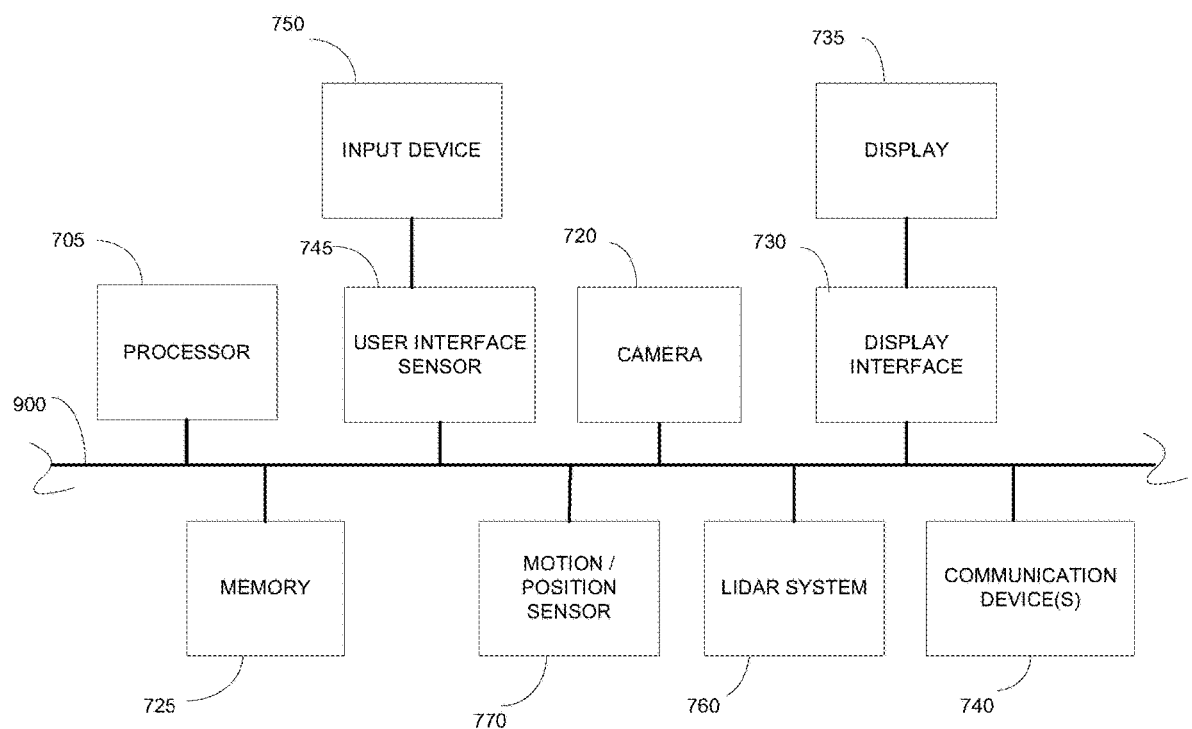
FIG. 7 is a block diagram that illustrates various elements of a possible electronic system, subsystem, controller and/or other component of an AV, and/or external electronic device.

FIG. 7 depicts an example of internal hardware that may be included in any of the electronic components of the system, such as internal processing systems of the AV, external monitoring and reporting systems, or remote servers. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments of the invention may include a computer-readable medium containing programming instructions that are configured to cause one or more processors and/or computing devices to perform the functions described in the context of the previous figures.

An optional display interface 730 may permit information from the bus 700 to be displayed on a display device 735 in visual, graphic or alphanumeric format, such on an in-dashboard display system of the vehicle. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication system. The communication device(s) 740 may be configured to be communicatively connected to a communications network, such as the Internet, a local area network or a cellular telephone data network.

The hardware may also include a user interface sensor 745 that allows for receipt of data from input devices 750 such as a keyboard or keypad, a joystick, a touchscreen, a touch pad, a remote control, a pointing device and/or microphone. Digital image frames also may be received from a camera 720 that can capture video and/or still images. The system also may receive data from a motion and/or position sensor 770 such as an accelerometer, gyroscope or inertial measurement unit. The system also may receive data from a LiDAR system 760 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include without, limitation, operating wheels or propellers to effectuate driving, flying or other transportation actions, operating robotic lifts for loading, unloading, medical-related processes, construction-related processes, and/or the like. Example automated devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

An "electronic device" or a "computing device" refers to a device that includes a processor and memory. Each device may have its own processor and/or memory, or the processor and/or memory may be conflicted with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

A "model" refers to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

As used herein, the terms "segmentation", "segmenting", and its derivatives refer, in addition to their ordinary meaning, to the process of selecting or otherwise defining a subset of a point cloud/image that forms a "segment" of the overall point cloud/image. The result of a segmentation process may involve generating a boundary, a demarcation, a list of pixels/voxels, an outline, an image fragment, a point cloud fragment, a highlighted region, or any other appropriate data used to distinguish the portions of the image/point cloud which have been selected (also referred to as the target data and/or the target region) from the portions of the image which have not been selected. For example, in certain embodiments segmenting a point cloud/image may result in copying a portion of the point cloud/image to a clipboard or other cache from which further operations can be performed. In other embodiments segmenting a point cloud/image may result in drawing a border around a portion of the point cloud/image which is the target of the segmentation. The segmented portions of the point cloud/image may or may not be contiguous, and may include incorporated "holes" which remain unselected and/or disconnected "islands" which are selected despite such disconnection.

In this document, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

What is claimed is:

1. A method for segmenting scan data, the method comprising, by a processor:
   identifying, from scan data representing a plurality of points in an environment associated with a ground and one or more objects, a subset of the plurality of points that lie within a threshold distance from a ground surface within a map as being likely to be associated with the ground;
   creating a graph using the identified subset of points from the plurality of points, the graph comprising:
   a plurality of vertices corresponding to only the identified subset of points from the plurality of points in the environment,
   a first terminal vertex associated with a ground label, and
   a second terminal vertex associated with a non-ground label;
   assigning, to each of the plurality of vertices, a unary potential corresponding to a cost of assigning that vertex to the ground label or the non-ground label;
   assigning a pairwise potential to each pair of neighboring vertices in the graph, the pairwise potential corresponding to a cost of assigning different labels to neighboring vertices;
   using the unary potentials and the pairwise potentials to identify labels for each of the plurality of points; and
   segmenting, based on the identified labels, the scan data to identify points associated with the ground.

2. The method of claim 1, further comprising:
   identifying one or more points of the plurality of points that are not associated with the ground; and
   using the one or more points that are not associated with the ground to identify the one or more objects.

3. The method of claim 2, further comprising using the identifications of the one or more objects for navigating an autonomous vehicle in the environment.

4. The method of claim 1, wherein creating the graph comprises creating the graph to include a plurality of edges connecting the plurality of vertices, the first terminal vertex, and the second terminal vertex.

5. The method of claim 4, wherein creating the graph comprises using at least one of the following: a K-nearest neighbor algorithm such that each of the plurality of edges has a corresponding weight, or a grid graph builder.

6. The method of claim 1, wherein using the unary potentials and the pairwise potentials to identify labels for each of the plurality of points comprises:
   determining a unary energy function as a sum over the unary potentials of all of the plurality of vertices; and
   determining a binary energy function using the plurality of pairwise potentials as a sum over all neighboring vertices of the plurality of vertices of a cost of assigning a pair of ground and non-ground labels to each pair of neighboring vertices.

7. The method of claim 6, wherein the unary energy is a function of one or more weighted features associated with each of the plurality of vertices and selected from at least one of the following: ground height; relative height; color; range; sensor pose uncertainty; ground height uncertainty; semantic labels; detection masks; intensity; localization output; grazing angle; surface normal compatibility; height above ground; occlusion checking; per point ground likelihood; or mesh compatibility.

8. The method of claim 6, wherein the binary energy is a function of one or more weighted features associated with each pair of neighboring vertices in the graph and selected from at least one of the following: point LIDAR intensity similarity between neighboring vertices, point color similarity between neighboring vertices, surface normal similarity, distance similarity, relative angle between neighboring vertices, or image color continuity.

9. The method of claim 6, further comprising performing a graph-cut for optimizing an energy function as a combination of the unary energy and the binary energy.

10. A system for segmenting scan data, the system comprising:
a processor; and
a non-transitory computer-readable medium comprising one or more programming instructions that when executed by the processor, cause the processor to:
identify, from scan data representing a plurality of points in an environment associated with a ground and one or more objects, a subset of the plurality of points that lie within a threshold distance from a ground surface within a map as being likely to be associated with the ground;
create a graph using the identified subset of the plurality of points in the environment, the graph comprising:
a plurality of vertices corresponding to only the identified subset of the plurality of points in the environment,
a first terminal vertex associated with a ground label, and
a second terminal vertex associated with a non-ground label;
assign, to each of the plurality of vertices, a unary potential corresponding to a cost of assigning that vertex to the ground label or the non-ground label;
assign a pairwise potential to each pair of neighboring vertices in the graph, the pairwise potential corresponding to a cost of assigning different labels to neighboring vertices;
using the unary potentials and the pairwise potentials to identify labels for each of the plurality of points; and
segment, based on the identified labels, the scan data to identify points associated with the ground.

11. The system of claim 10, further comprising programming instructions that when executed by the processor, cause the processor to:
identify one or more points of the plurality of points that are not associated with the ground; and
use the one or more points that are not associated with the ground to identify the one or more objects.

12. The system of claim 11, further comprising programming instructions that when executed by the processor, cause the processor to use the identifications of the one or more objects for navigating an autonomous vehicle in the environment.

13. The system of claim 10, wherein the programming instructions that when executed by the processor to cause the processor to create the graph comprise programming instructions to cause the processor to create the graph to include a plurality of edges connecting the plurality of vertices, the first terminal vertex, and the second terminal vertex.

14. The system of claim 10, wherein the programming instructions that when executed by the processor, cause the processor to use the unary potentials and the pairwise potentials to identify labels for each of the plurality of points comprise programming instructions that when executed by the processor, cause the processor to:
determine a unary energy function as a sum over the unary potentials of all of the plurality of vertices; and
determine a binary energy function using the plurality of pairwise potentials as a sum over all neighboring vertices of the plurality of vertices of a cost of assigning a pair of ground and non-ground labels to each pair of neighboring vertices.

15. The system of claim 14, wherein the unary energy is a function of one or more weighted features associated with each of the plurality of vertices and selected from at least one of the following: ground height; relative height; color; range; sensor pose uncertainty; ground height uncertainty; semantic labels; detection masks; intensity; localization output; grazing angle; surface normal compatibility; height above ground; occlusion checking; per point ground likelihood; or mesh compatibility.

16. The system of claim 14, wherein the binary energy is a function of one or more weighted features associated with each pair of neighboring vertices in the graph and selected from at least one of the following: point LIDAR intensity similarity between neighboring vertices, point color similarity between neighboring vertices, surface normal similarity, distance similarity, relative angle between neighboring vertices, or image color continuity.

17. The system of claim 14, further comprising programming instructions that when executed by the processor, cause the processor to perform a graph-cut for optimizing an energy function as a combination of the unary energy and the binary energy.

18. A computer program product for segmenting scan data, the computer program product comprising a non-transitory computer readable medium encoded with one or more instructions that are configured to cause a processor to:
identify, from scan data representing a plurality of points in an environment associated with a ground and one or more objects, a subset of the plurality of points that lie within a threshold distance from a ground surface within a map as being likely to be associated with the ground;
create a graph using the identified subset of the plurality of points in the environment, the graph comprising:
a plurality of vertices corresponding to only the identified subset of the plurality of points in the environment,
a first terminal vertex associated with a ground label, and
a second terminal vertex associated with a non-ground label;
assign, to each of the plurality of vertices, a unary potential corresponding to a cost of assigning that vertexto the ground label or the non-ground label;
assign a pairwise potential to each pair of neighboring vertices in the graph, the pairwise potential corresponding to a cost of assigning different labels to neighboring vertices;
using the unary potentials and the pairwise potentials to identify labels for each of the plurality of points; and
segment, based on the identified labels, the scan data to identify points associated with the ground.

* * * * *